(12) United States Patent
Pettinaroli et al.

(10) Patent No.: US 6,668,643 B1
(45) Date of Patent: Dec. 30, 2003

(54) OPTICAL FLOW-METER DEVICE

(75) Inventors: Giulio Pettinaroli, S. Maurizio d'Opaglio (IT); Giorgio Simonotti, Gattico (IT)

(73) Assignees: Hydronic Components, Inc., Madison Heights, MI (US); Fratelli Pettinaroli S.p.A. (IT)

( * ) Notice: Subject to any disclaimer, the term of this patent is extended or adjusted under 35 U.S.C. 154(b) by 0 days.

(21) Appl. No.: 10/320,676

(22) Filed: Dec. 17, 2002

(51) Int. Cl.$^7$ .................................................. G01F 3/14
(52) U.S. Cl. ....................................... 73/239; 73/861.57
(58) Field of Search ........................ 73/861.57, 861.58, 73/239, 290 R, 305, 323, 250

(56) References Cited

U.S. PATENT DOCUMENTS

| 4,572,004 | A | * | 2/1986 | White | 73/861.58 |
| 4,611,105 | A | | 9/1986 | Kobold | 200/81.9 |
| 5,193,400 | A | * | 3/1993 | Lew | 73/861.56 |
| 5,392,648 | A | * | 2/1995 | Robertson | 73/239 |
| 5,895,844 | A | * | 4/1999 | Krueger | 73/119 A |
| 6,152,889 | A | * | 11/2000 | Sopp et al. | 600/578 |
| 6,170,338 | B1 | | 1/2001 | Kleven et al. | 73/861.22 |
| 6,189,389 | B1 | | 2/2001 | van Bekkum et al. | 73/861.18 |
| 6,216,727 | B1 | * | 4/2001 | Genova et al. | 137/487.5 |
| 6,338,278 | B1 | * | 1/2002 | Tsataros | 73/861.56 |
| 6,338,279 | B1 | * | 1/2002 | Tsataros | 73/861.56 |
| 6,339,959 | B1 | * | 1/2002 | Natapov | 73/239 |

* cited by examiner

Primary Examiner—Edward Lefkowitz
Assistant Examiner—Corey D. Mack
(74) Attorney, Agent, or Firm—Charles W. Chandler

(57) ABSTRACT

A optical flow-meter device comprises an outer tubular body provided with an inlet pipe fitting and an outlet pipe fitting for a fluid, and a tubular element made of transparent plastic material, which sealingly extends inside the body between the inlet and the outlet pipe fittings. The outer tubular body has two facingly arranged side openings for the insertion of a light-emitting element, and a light-receiving element connected to an electronic flow control and digital reading unit. A light-shuttering member is axially slidable within the inner tubular element and is shaped to allow the fluid to flow and at the same time to partialize or gradually shutter the light beam between the emitter and the receiver, providing an electronic signal proportional to the fluid flow running along the inner tubular element. A biasing spring member acts on the light-shuttering member to balance the fluid thrust.

13 Claims, 2 Drawing Sheets

OPTICAL FLOW-METER DEVICE

BACKGROUND OF THE INVENTION

This invention refers to a device for measuring the flow-rate of a fluid along a conduit, as well as regards a digital flow-meter comprising the aforementioned measuring device combined with an optical flow-rate detecting and reading system.

Several measuring devices are currently known by which it is possible to provide a visual indication of the flow-rate of a fluid flowing along a measuring tubular element, in which the flow-rate value is directly read on a flow-meter in respect to the position of a float visible through a suitable window, or by mechanical, magnetic or electrical detection to be read on a proper dial of an electronic reading instrument.

Float-type systems are widely diffused, in that they are easily installable and are of relatively low cost; nevertheless, they present the serious drawback of providing a somewhat imprecise measurement of the flow-rate, as well as being difficult to read in presence of a turbid fluid or due to a possible deposition of lime on the window for displaying the float.

While on one hand mechanical-type flow-meters provide a sufficiently precise measurement of the flow rate, nevertheless they are extremely complex in structure, and subject to wear problems, as well as allow only an in situ reading of the flow-rate without any possibility of transferring the detected data to remote positions or of managing the information.

There are also electric, magnetic or ultrasound-type of flow-rate measuring devices which require sophisticated technologies and the use of probes or electrical and/or magnetic components designed to come into contact with metal parts, while a fluid or a gas is flowing along a measuring pipe. Flow-meters of this kind are known for example by U.S. Pat. Nos. 6,189,389 issued Feb. 20, 2001 to Jan Aart van Bekkum and Vladimir Smychliaev for "Ultrasonic Flowmeter"; U.S. Pat. No. 6,170,338 issued Jan. 9, 2001 to Lowell A. Kleven, et al. for "Vortex Flowmeter with Signal Processing"; and U.S. Pat. No. 4,611,105 issued Sep. 9, 1986 to Klaus Kobold for "Device for the Measurement of Through-Flow with Potential-Free End Contact Switch".

Besides being structurally complex and relatively expensive, in that the various electric and/or magnetic members for measuring the flow-rate constitute an integral part of the same flow-meter, these types of flow-meters also involve some drawbacks, due to induced currents, eddy currents, or external magnetic fields which tend to negatively influence the measurement of the flow-rate.

OBJECT OF THE INVENTION

A first object of this invention is to provide a tubular flow-meter device for measuring the flow-rate of a fluid, liquid or gas, which can be permanently associated with a duct or circulation system for the fluid, and which can be used in combination with an electronic apparatus, made as a separate part, for detecting and measuring the flow-rate.

A second object of this invention is to provide a digital flow-meter capable of obviating the drawbacks of previously known flow-meters, comprising the aforementioned tubular measuring device, combined with an electronic flow detecting apparatus provided with an optical flow-sensing system which is wholly devoid of negative external influences, extremely economical and easily installable.

In this way, an operator, having a single reading instrument, can measure the flow in different points of a single circulation system for the fluid or in different systems, in which a tubular measuring device according to the invention has been installed.

BRIEF DESCRIPTION OF THE INVENTION

In general, according to a first aspect of the invention, a tubular device for measuring the flow-rate of a fluid along a duct, has been provided, the device comprising:
- an outer tubular body provided with an inlet pipe fitting and an outlet pipe fitting for the fluid;
- a tubular element, made of transparent plastic material, which sealingly extends inside the outer tubular body, between the aforesaid inlet and outlet pipe fittings;
- said outer tubular body being provided on opposite sides with openings for seating, respectively, a light-emitting element and a light-receiving element facing each other;
- an axially slidable light-shuttering member entrained by the flow within the inner tubular element, said light-shuttering member being shaped to partialize the light beam between the light-emitting element and the light-receiving element to provide an electric signal proportional to the flow-rate; and
- a biasing spring member acting on the light-shuttering member to balance the thrust exerted by the fluid flowing along said inner tubular element.

According to another aspect of the invention, an electronic flow-meter device has been provided, comprising an apparatus for sensing and measuring the flow-rate, in combination with the aforementioned tubular measuring device, in which the light emitter and light receiver are removably disposable into opposed side openings in the outer tubular body of the measuring device, and in which the light emitter and light receiver are connected to an electronic control unit designed to provide a digital indication of the flow-rate.

BRIEF DESCRIPTION OF THE DRAWINGS

These and further features of the invention, will be more clearly evident from the following description with reference to the accompanying drawings, in which.

DETAILED DESCRIPTION OF THE INVENTION

Figure 1:
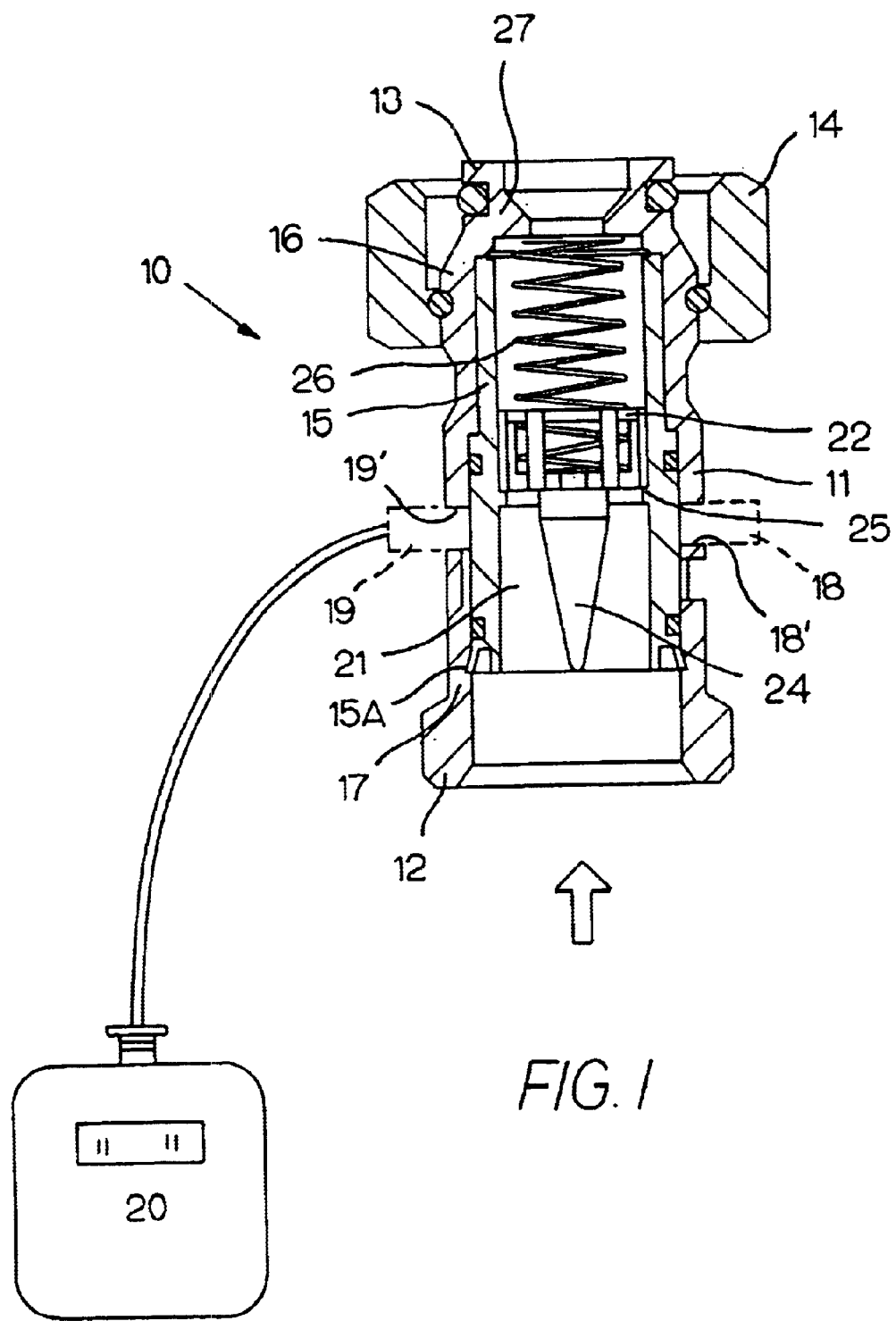
FIG. 1 shows an overall view of the whole flow-meter illustrating a first preferred embodiment of the tubular measuring device according to the invention.
Figure 2:
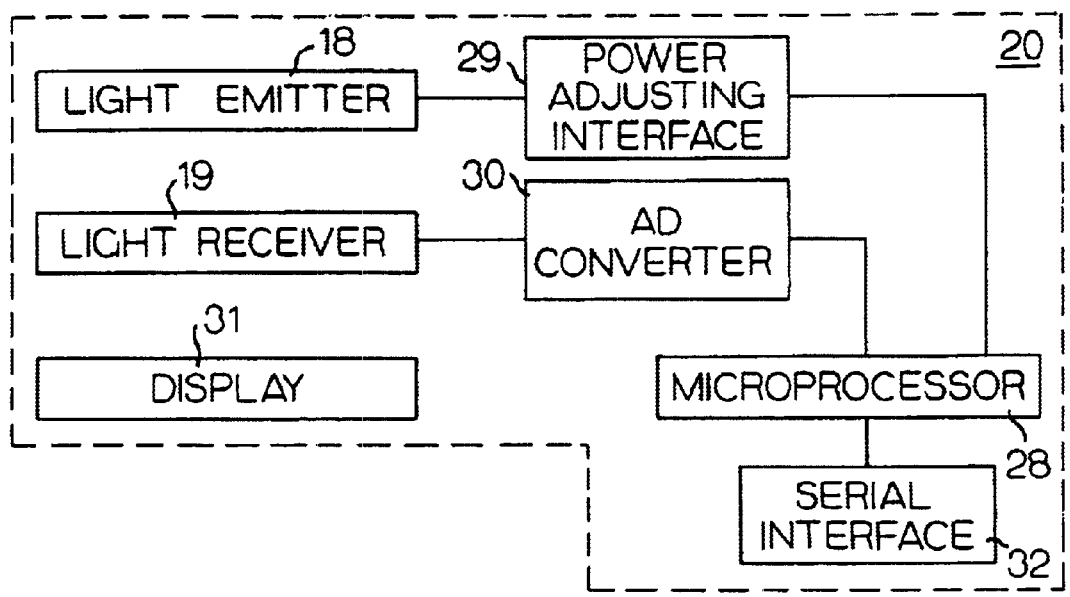
FIG. 2 shows a block diagram of the electronic flow-rate measuring and reading apparatus.

With reference to FIGS. 1 and 2, a description is given of a first embodiment of a measuring device and an optical flow-meter according to this invention.

Reference number 10 in FIG. 1 indicates a tubular measuring device designed to be connected to a duct or a system through which a fluid circulates whose flow-rate is to be measured.

Device 10 comprises an outer tubular body 11 having an inlet pipe fitting 12 and an outlet pipe fitting 13 provided with a screw-on cap 14.

Device 10 also comprises an inner tubular element 15, also referred to as measuring tube, which sealingly extends in a coaxial direction in the tubular body 11, between the inlet pipe fitting 12 and the outlet pipe fitting 13, as shown.

Inner tubular element 15 is axially secured against an annular shoulder 16 in correspondence with the outlet pipe fitting 13, and against an annular shoulder 17 in correspondence with inlet pipe fitting 12, by the re-flanging of its end 15A.

Outer tubular body 11 can be made of any suitable material, for example, of brass or of plastic material, while the inner tubular element 15 is made of transparent plastic material to allow the passage of a light beam, for example infrared rays beam emitted by a light-emitting diode 18, disposed on one side of tubular body 11, received by an infrared receiving diode 19 on the opposite side which oppose each other and connected to a computerised flow-sensing and flow-rate reading unit 20.

For this purpose, outer tubular body 11, has side openings 18' and 19' facing each other to allow the insertion of a light-emitting diode 18 and a light-receiving diode 19 supported by suitable pliers, not shown, whereby it is possible at any time to freely introduce the two diodes 18 and 19 into their respective openings 18',19' to carry out a flow measuring operation, and to remove the diodes once the reading has been made.

In this way, the operator may use a single instrument 20 to carry out the reading operations of the flow-rate in correspondence with the various points of a same system, or of different systems, where the respective measuring devices 10 according to the invention have been appropriately installed.

Referring again to FIG. 1, a light-shuttering member, in particular a light shutter entrained by the flow, slides within measuring tube 15, indicated as a whole by reference 21, comprising a guide cage 22 having peripheral passages for the fluid, from the bottom of which extends a conical casing 24 designed to partially or totally intercept or shutter the light beam emitted by the photodiode 18 and received by the photodiode 19, in relation to the position assumed.

Due to the particular conical profile of casing 24, which converges towards the inlet pipe fitting 12, during the axial sliding of shutter 21, under the thrust exerted by the fluid, balanced by a spring 26, conical casing 24 gradually intercepts the light beam in the section between the two photodiodes 18 and 19, providing instrument 20 with a corresponding electric signal indicating the value of the flow-rate of fluid running through inner tubular element 15.

For this purpose, shutter 21 is pushed against a stop shoulder 25 inside tubular element 15, by a calibrated biasing spring member 26 interposed between the bottom of cage 22 and an annular shoulder 27 in correspondence with the outlet pipe fitting 13.

Biasing spring 26 axially acts on light shutter 21 to balance the thrust exerted by the fluid which tends to drag shutter 21 in its direction of flow.

It is therefore evident that the balanced position assumed by shutter 21 under the opposing thrusts of the fluid flowing through tubular element 15 and of biasing spring 26, depends upon the value of the flow-rate of the fluid which at a given instant flows along tubular element 15; consequently, the light beam received by photodiode 19 is partially intercepted and the photodiode 19 in turn sends instrument 20 a signal indicating the value of the measured flow-rate, expressed in litres per minute or in another measuring unit, which appears on the display of instrument 20.

FIG. 2 shows, by way of example, a block diagram of measuring instrument 20. Measuring instrument 20 comprises a suitably programmed microprocessor 28 to control the various functions of the apparatus.

Microprocessor 28 is connected, by means of a power adjusting interface 29, to light-emitting diode 18; likewise, microprocessor 28 is connected, by means of a digital amplifier converter 30, or AD converter, to light-receiving diode 19.

Microprocessor 28 is also connected to a liquid crystal display 31, for viewing the reading, as well as to a serial interface 32 for connection to a personal computer or other remote reading device.

The methods of use and operation of the flow-meter are as follows.

Whenever a measurement is to be made, an operator equipped with instrument 20, inserts the two photodiodes 18 and 19 into the corresponding seatings consisting of side openings 18',19' in outer tubular body 11.

After the instrument has been switched on by pressing an appropriate "ON" button, microprocessor 28, through interface 29, controls the transmission of a current value to the transmitting diode 18, equal to half the maximum permitted value; consequently, the receiving diode 19 transmits a signal to microprocessor 28, through amplifier 30, which should be equal to the signal generated by light transmitter 18, in the absence of flow in measuring duct 15. If the measured value is different, microprocessor 28 suitably compensates the latter by means of a proper digital potentiometer inside interface 29, controlled by the same microprocessor.

When the value measured by receiving photodiode 19 is identical to that emitted by light-emitting diode 18, or has been compensated as a result of the change due to the transparency variation of the fluid caused, for example, by impurities in the latter, or for other causes, the measurement of the flow-rate can be carried out by allowing the fluid to flow through tubular measuring element 11. For this purpose, it is sufficient to press the start button on the instrument which, in addition to monitoring the flow values, saves them as data in a memory of the microprocessor, which can be subsequently read directly by means of instrument 20, or by means of a remote reading instrument to which microprocessor 28 is connected by means of serial interface 32.

By suitable programming of instrument 20, it is possible to carry out the flow-rate readings in different measuring units, for example in litres or gallons per second, by selecting the required measuring unit by means of a suitable button.

The flow-rate values read may be stored on the proper EEPROM memory and later displayed by pressing the appropriate button to retrieve them from the memory.

Whenever it is required to measure another dimension, for example the fluid temperature, in addition to photodiodes 18 and 19, it is possible to make use of a temperature sensor having a probe, not shown, which can be introduced into a suitable opening 36 in outer tubular body 11, by means of the same pincers for supporting photodiodes 18 and 19. Instrument 20 should therefore be suitably preset, by means of microprocessor 28, to control the various sensors and to selectively provide a temperature detection of the fluid, or a flow-rate measurement of the fluid, as described previously.

Light shutter 21 in FIG. 1 presents a body 24 having a conical shape which by moving forward or backward creates a continuous variation in the light beam emitted by photodiode 18 and which passes through the transparent tubular element 15 and the fluid inside the latter and is received by photodiode 19.

The geometry of light shutter 21 need not necessarily to be the one shown in FIG. 1; it can be of any shape designed to obscure and so to gradually vary the quantity of light transmitted by photodiode 18 and received by photodiode 19.

Figure 3:
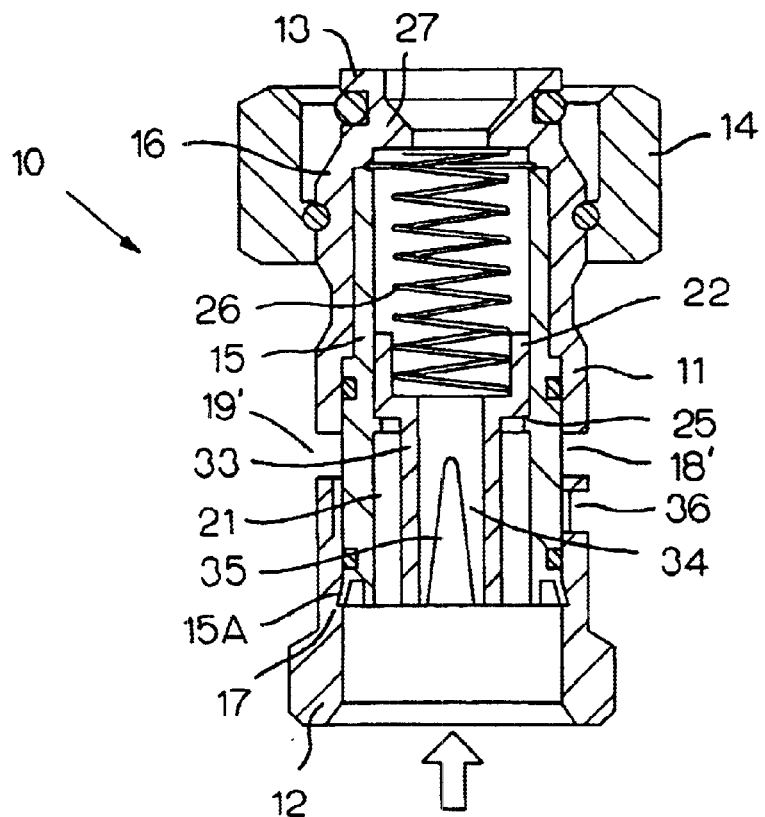
FIG. 3 shows a longitudinal cross-sectional view of a possible variation of the tubular measuring device for a flow-meter according to the invention.

A further possible embodiment of shutter 21 is shown by way of example in FIG. 3, where the same numerical references of FIG. 1 have been used to indicate similar or equivalent parts.

The device of FIG. 3 differs from the device of FIG. 1 in that light shutter 21 in this second case consists of a substantially cylindrical body 33 having an axial passage 34 for the fluid, which opens out at both ends towards inlet pipe fitting 12 and respectively towards outlet pipe fitting 13 of the measuring device.

Unlike the previous case, the light beam generated by photodiode 18 passes through a pair of opposing slits 35, only one of which is shown in the cross-sectional view of FIG. 3, which are constantly maintained oriented in respect to the two photodiodes 18 and 19, by means of a longitudinal guide which prevents shutter 21 from rotating.

The two openings 35 are substantially shaped in the form of an upturned V which opens out towards the lower edge of the shutter.

Other geometrical shapes of shutter 21 are obviously possible, provided they are suitable for the desired purpose.

From what has been described and shown, it will be clear that what is provided is a tubular device for measuring flow-rates, capable of being used with an electronic reading apparatus, as well as an optical flow-meter comprising, in combination, the tubular measuring device, and the electronic apparatus for measuring and reading the flow-rate and/or the temperature, characterised by an extreme versatility in use. In fact, the tubular measuring device proves to be structurally simple and inexpensive, and is consequently suitable for permanent application at any point of a system or of a duct in which it is necessary to periodically check and measure the flow-rate. The operator will consequently have at his disposal a single reading instrument, whose light-transmitting diode and light-receiving diode may be inserted each time into the corresponding seatings in outer tubular body 11 of the measuring device, at the moment of use, and then subsequently removed.

It is understood, however, that what has been described and shown with reference to the accompanying drawings has been given purely by way of example and that other modifications may be made to the tubular flow-rate measuring device, to the electronic reading apparatus and to their assembly, without deviating from the scope of the accompanying claims.

Having described our invention, we claim:

1. A device for measuring the flow-rate of a fluid, comprising:
    an outer tubular body provided with an inlet pipe fitting and an outlet pipe fitting for the fluid;
    an inner tubular element made of transparent plastic material, which sealingly extends inside the outer tubular body, between said inlet and outlet pipe fittings;
    said outer tubular body being provided on opposite sides with openings for seating, respectively, a light-emitting element and a light-receiving element facing each other;
    an axially slidable light-shuttering member entrained by the flow within the inner tubular element, said light shutter being shaped to partialize the light beam between the light-emitting element and the light-receiving element to provide an electric signal proportional to the flow-rate; and
    a biasing spring member acting on the light-shuttering member to balance the thrust exerted by the fluid flowing along said inner tubular element of the device.

2. A device according to claim 1, characterised in that the light-shuttering member comprises a guide cage having passages for the fluid, and a light-shuttering body for gradual interception of the light beam between said light emitter and said light receiver, said light-shuttering member extending from said guide cage and being coaxially arranged to the inner tubular element.

3. A device according to claim 2, characterised in that said light-shuttering member has a shaped body converging towards the inlet pipe fitting.

4. A device according to claim 2, characterised in that said light-shuttering member has a conical shape.

5. A device according to claim 1, characterised in that the light-shuttering member comprises a cylindrical body having an axial passage for the fluid.

6. A device according to claim 5, characterised in that said cylindrical body of the shuttering member is provided on opposite sides with openings for passing the light beam.

7. A device according to claim 6, characterised in that said openings for passage of the light beam comprise side edges diverging towards the inlet pipe fitting for the fluid.

8. A flow-meter comprising in combination:
    a tubular flow-rate measuring device and an electronic flow-rate reading apparatus, in which said flow-rate measuring device comprises:
        an outer tubular body having an inlet pipe fitting and an outlet pipe fitting for the fluid;
        an inner tubular element made of transparent plastic material which sealingly extends inside the outer tubular body, between said inlet and outlet pipe fittings;
        said outer tubular body being provided on opposite sides with openings for seating, respectively, a light-emitting element and a light-receiving element facing each other;
        an axially slidable light-shuttering member entrained by the flow within the inner tubular element, said light-shuttering member being shaped to partialize the light beam between the light-emitting element and the light-receiving element to provide an electric signal proportional to the flow-rate; and
    a biasing spring member acting on the light-shuttering member to balance the thrust exerted by the fluid flowing along said inner tubular element; and
    whereby the light-emitting element and the light-receiving element are connected to an electronic reading apparatus and are removably disposable in the side openings in said outer tubular body.

9. A flow-meter according to claim 8, characterised in that the electronic reading apparatus comprises a microprocessor operatively connected to the light-emitting element by a power adjusting interface.

10. A flow-meter according to claim 8, in which the microprocessor is programmed to self-adjust the power supplied to the light transmitter, in relation to the level of a setting signal provided by the light-receiving element through an AD Converter.

11. A flow-meter according to claim 8, further characterised by comprising a fluid temperature detecting probe, connected to the electronic reading apparatus, said probe being removably disposable in a corresponding seat in the outer tubular body.

12. A flow-meter according to claim 11, characterised in that the microprocessor of the electronic reading apparatus is programmed to selectively provide a measurement of the flow-rate, and respectively, a detection of the fluid temperature.

13. A flow-meter according to claim 8, characterised in that the microprocessor is programmed to provide a measurement of the flow-rate, in different measuring units selectable by the same electronic flow reading apparatus.

* * * * *